US012481895B2

(12) United States Patent
Upadhyay et al.

(10) Patent No.: US 12,481,895 B2
(45) Date of Patent: Nov. 25, 2025

(54) TRAINING INDIVIDUALLY FAIR MACHINE LEARNING ALGORITHMS VIA DISTRIBUTIONALLY ROBUST OPTIMIZATION

(71) Applicants: International Business Machines Corporation, Armonk, NY (US); Regents of the University of Michigan, Ann Arbor, MI (US)

(72) Inventors: Sohini Upadhyay, Cambridge, MA (US); Mikhail Yurochkin, Cambridge, MA (US); Debarghya Mukherjee, Ann Arbor, MI (US); Yuekai Sun, Ann Arbor, MI (US); Amanda Ruth Garcia Bower, Melvindale, MI (US); Seyed Hamid Eftekhari, Ypsilanti, MI (US); Alexander Vargo, Ann Arbor, MI (US); Fan Zhang, Fushun (CN)

(73) Assignees: International Business Machines Corporation, Armonk, NY (US); University of Michigan, Ann Arbor, MI (US)

(*) Notice: Subject to any disclaimer, the term of this patent is extended or adjusted under 35 U.S.C. 154(b) by 1159 days.

(21) Appl. No.: 17/213,167

(22) Filed: Mar. 25, 2021

(65) Prior Publication Data

US 2022/0318639 A1    Oct. 6, 2022

(51) Int. Cl.
 *G06N 5/01* (2023.01)
 *G06F 18/214* (2023.01)
 *G06F 18/22* (2023.01)

(52) U.S. Cl.
 CPC .............. *G06N 5/01* (2023.01); *G06F 18/214* (2023.01); *G06F 18/22* (2023.01)

(58) Field of Classification Search
 CPC .......... G06N 5/01; G06N 5/003; G06F 18/22; G06F 18/214; G06K 9/6215; G06K 9/6256
 See application file for complete search history.

(56) References Cited

U.S. PATENT DOCUMENTS

| 10,282,414 B2 | 5/2019 | Latapie et al. |
| 10,433,194 B2 | 10/2019 | Mcfarland et al. |

(Continued)

FOREIGN PATENT DOCUMENTS

| CA | 3060144 A1 | 4/2020 | |
| CA | 3070817 A1 * | 7/2021 | ............. G06V 10/82 |

OTHER PUBLICATIONS

Mahdi Kamani, Mohammad, et al. "Efficient Fair Principal Component Analysis." arXiv e-prints (2020): arXiv-1911 v2. (Year: 2020).*

(Continued)

*Primary Examiner* — Randall K. Baldwin
(74) *Attorney, Agent, or Firm* — Caleb Wilkes; Otterstedt & Kammer PLLC

(57) ABSTRACT

Obtain a first data set, a second data set, and a machine learning model. Construct a sensitive subspace of the first data set that defines a fair metric for distance among elements of the first data set. Fairly train the machine learning model on the first data set using a distributionally robust optimization approach based on the fair metric. Produce an individually fair set of labels by applying the fairly trained machine learning model to the second data set. Allocate a resource according to the individually fair set of labels.

14 Claims, 13 Drawing Sheets

(56) References Cited

U.S. PATENT DOCUMENTS

| | | | |
|---|---|---|---|
| 10,572,215 | B1 | 2/2020 | Cooper et al. |
| 2020/0082299 | A1 | 3/2020 | Vasconcelos et al. |
| 2020/0097997 | A1* | 3/2020 | Li ........................ G06N 20/00 |
| 2020/0218825 | A1 | 7/2020 | Krishnamoorthy |
| 2020/0226489 | A1* | 7/2020 | Li ........................ G06N 20/00 |
| 2022/0114399 | A1* | 4/2022 | Castiglione .......... G06V 10/751 |
| 2022/0114464 | A1* | 4/2022 | Yang ...................... G06N 20/20 |
| 2024/0312198 | A1* | 9/2024 | Miroshnikov ........ G06V 10/774 |

OTHER PUBLICATIONS

Yurochkin, Mikhail, Amanda Bower, and Yuekai Sun. "Training individually fair ML models with sensitive subspace robustness." arXiv preprint arXiv:1907.00020 v2 (Mar. 13, 2020). (Year: 2020).*

Mukherjee, Debarghya, et al. "Two Simple Ways to Learn Individual Fairness Metrics from Data." arXiv preprint arXiv:2006.11439 (2020). (Year: 2020).*

Lal, G. Roshan, Sahin Cem Geyik, and Krishnaram Kenthapadi. "Fairness-aware online personalization." arXiv preprint arXiv:2007.15270 (2020). (Year: 2020).*

Yijie Wang, et al. "Wasserstein Robust Classification with Fairness Constraints" arXiv preprint arXiv:2103.06828v1 (Mar. 11, 2020). (Year: 2020).*

Mandal, Debmalya, et al. "Ensuring Fairness Beyond the Training Data." arXiv preprint arXiv:2007.06029 (2020). (Year: 2020).*

Alexander Vargo et al. "Individually Fair Gradient Boosting—Comments," Openreview.net, Sep. 2020, pp. 1-7.

Amanda Bower et al. "Individually Fair Rankings—Comments," Openreview.net Sep. 2020, pp. 1-9.

Mikhail Yurochkin et al. "SenSel: Sensitive Set Invariance for Enforcing Individual Fairness." arXiv preprint arXiv:2006.14168. Jun. 2020. pp. 1-11. 102(b)(1)(A) disclosure.

Alexander Vargo. "Applications of Machine Learning: From Single Cell Biology to Algorithmic Fairness." U. Mich. Doctoral dissertation. Oct. 2020. 102(b)(1)(A) disclosure.

Amanda Bower. "Dealing with Intransitivity, Non-Convexity, and Algorithmic Bias in Preference Learning." U. Mich. Doctoral dissertation. Feb. 2021. 102(b)(1)(A) disclosure.

Mikhail Yurochkin et al. "Learning Fair Predictors with Sensitive Subspace Robustness." arXiv.org preprint 1907.0002v1. Jun. 2019. pp. 1-23.

Bruthi Gorantla et al. "Ranking for Individual and Group Fairness Simultaneously." arXiv.org preprint 2010.06986v1. Sep. 2020. pp. 1-19.

Alexander Vargo et al. "Individually Fair Gradient Boosting," Openreview.net, ICLR 2021 Conference Paper 2257. Sep. 2020, pp. 1-11. 102(b)(1)(A) disclosure.

Amanda Bower et al. "Individually Fair Ranking." Openreview.net Sep. 2020, ICLR 2021 Conference Paper 2577. pp. 1-11. 102(b)(1)(A) disclosure.

Peter Mell et al., "The NIST Definition of Cloud Computing". Special Publication 800-145. NIST. Sep. 2011, pp. 1-7.

John E. Kelly III, "Computing, cognition, and the future of knowing", IBM Corp. Oct. 2015. pp. 1-7.

Yair Horesh et al. "Paired-Consistency: An Example-Based Model-Agnostic Approach to Fairness Regularization in Machine Learning." arXiv.org preprint 1908.02641v2. Dec. 2019. pp. 1-15.

Trisha Mahoney et al. "AI Fairness: How to Measure and Reduce Unwanted Bias in Machine Learning." O'Reilly. Feb. 2020. pp. 1-35.

Anonymous. "Heirarchical Multi-Agent Systems for Multi-Objective / Multi-Metric Classification." IP.com IPCOM000262616D. Jun. 2020. pp. 1-5.

Anonymous. "System and MEthod for Jointly Ensuring Diversity in Fairness/Unbiasedness in Search Results." IP.com IPCOM000268760D. Jun. 2019. pp. 105.

Philipp Hacker et al. "A Continuous Framework for Fairness." arXiv.org preprint 1712.07924v1. Dec. 2017. pp. 1-22.

Denton et al., "Image Counterfactual Sensitivity Analysis for Detecting Unintended Bias", arXiv: 1906.06439v3 [cs.CV], Oct. 3, 2020, 12 pages.

Dwork et al., "Fairness Through Awareness", arXiv:1104.3913v2 [cs.CC], Nov. 29, 2011, 24 pages.

Garg et al., "Counterfactual Fairness in Text Classification through Robustness", arXiv: 1809.10610v2 [cs.LG], Feb. 13, 2019, 08 pages.

Kannan et al., "Adversarial Logit Pairing", arXiv: 1803.06373v1 [cs.LG], Mar. 16, 2018, 10 pages.

Kusner et al., "Counterfactual Fairness", arXiv: 1703.06856v3 [stat.ML], Mar. 8, 2018, 18 pages.

Lahoti et al., "Operationalizing Individual Fairness with Pairwise Fair Representations", Proceedings of the VLDB Endowment, vol. 13, No. 4 ISSN 2150-8097, Dec. 2, 2019, 13 pages, DOI: https://doi.org/10.14778/3372716.3372723.

Madry et al., "Towards Deep Learning Models Resistant to Adversarial Attacks", arXiv: 1706.06083v4 [stat.ML], Sep. 4, 2019, 28 pages.

* cited by examiner

Algorithm 1 Fair Gradient Boosting

201 → Input: Labeled training data $\{(x_i, y_i)\}_{i=1}^n$; class of weak learners $H$; initial predictor $f_0$; search radius $\epsilon$; number of steps $T$; sequence of step sizes $\alpha(t)$; fair metric $d_x$ on $\chi$.

202 → Define the matrix $C$ by $C_{ij} \leftarrow d_x^2(x_i, x_j)$.

203 → for $t = 0, 1 ..., T - 1$ do

204 → Define the matrix $R_t$ by $(R_t)_{ij} = l(f_t, (x_i, y_j))$

205 → Find $\Pi_t^* \in \arg\max_{\Pi \in \Gamma} \langle R_t, \Pi \rangle$.

206 → $P_{t+1}(\{x_i, k\}) \leftarrow (\Pi_t^* \cdot y^k)_i$

207 → Fit a base learner $h_t \in H$ to the set of pseudo-residuals $\left\{ \frac{\partial L}{\partial f_t(x_i)} \right\}_{i=1}^n$ 208 → Let $f_{t+1} = f_t + \alpha_t h_t$.

209 → end for

210 → return $f_T$

| Algorithm 2 SGD to find optimal dual variable $\eta^*$ |
|---|

221 → Input: Starting point $\eta_1 > 0$; cost matrix $C$; loss matrix $R$; tolerance $\epsilon$; batch size $B$; step sizes $\alpha_t > 0$.
222 → repeat
223 →   Sample indices $j_1,...,j_B$ uniformly at random from $\{1,...,n\}$.
224 →   Let $R_t \leftarrow$ columns $j_1,...,j_B$ of $R$. Let $C_t \leftarrow$ columns $j_1,...,j_B$ of $C$. $\{R_t, C_t \in \mathbb{R}^{n \times B}\}$
225 →   Let $w_t(\eta) \leftarrow \eta \cdot \epsilon + \frac{1}{B}\sum_{j=1}^{B} \max_i R_{ij} - \eta C_{ij}$
226 →   $\eta_{t+1} \leftarrow \max\{0, \eta_t - \alpha_t \epsilon - \alpha_t \frac{d}{d\eta}w_t(\eta)\}$
227 → until converged

FIG. 2B

Algorithm 3 Approximate $\Pi^*$ from the dual optimizer $\eta^*$

241 → Input: cost matrix $C$; loss matrix $R$; value of $\eta^*$
242 → Let $\Pi$ be an $n \times n$ matrix of zeros.
243 → for $j = 0$ to $n - 1$ do
244 →    Choose $i \in \arg\max_i R_{ij} - \eta^* C_{ij}$
245 →    Set $\Pi_{ij} = \frac{1}{n}$.
246 → end for
247 → return $\Pi$

*FIG. 2C*

| Algorithm 4 Fair gradient boosted trees (BuDRO) |
|---|
| 261 → Input: Data $D = \{(x_i, y_i)\}_{i=1}^n$; perturbation budget $\epsilon$; loss function $\ell$; fair metric $d_x$ on $\mathcal{X}$; number of boosting steps $T$; GBDT parameters $\rho$, batch size $B$ |
| 262 → Let $D_0 = \{(x_i, 0)\}_{i=1}^n$; $\cup \{(x_i, 1)\}_{i=1}^n$ |
| 263 → Define $C$ by $C_{ik} \leftarrow d_x(x_i, x_k)$. |
| 264 → Let $f_0$ = TreeBoost.Train ($\rho$, data =$D_0$, Steps =1) {Run one step of naive boosting} |
| 265 → for $t = 0$ to $T - 1$ do |
| 266 →   Define $R$ by $R_{ij} = \ell(f_t, (x_i, y_i))$. |
| 267 →   Compute the dual optimal $\eta^*$ following Algorithm 2 with inputs $C, R, \epsilon,$ and $B$ |
| 268 →   Use $\eta^*$ to construct $\Pi_t$ following Algorithm 3 |
| 269 →   Let $w_t$ be the concatenation of $\Pi_t \cdot y^0$ and $\Pi_t \cdot y^1$. |
| 270 →   Let $f_{t+1} \leftarrow$ TreeBoost.Train($\rho$, $f_t$, data = $D_0$, weights = $w_t$, Steps =1). |
| 271 → end for |
| 272 → Return $f_T$. |

| Method | BAcc | Status cons | Age Gaps | |
|---|---|---|---|---|
| | | | $GAP_{Max}$ | $GAP_{RMS}$ |
| BuDRO | .715 | .974 | .185 | .151 |
| Baseline | .723 | .920 | .310 | .241 |
| Project | .698 | .960 | .188 | .144 |
| Baseline NN | .687 | .826 | .234 | .179 |

*FIG. 2E*

Algorithm 1: SenSTIR: Sensitive Set Transport Invariant Ranking

Input: Initial Parameters: $\theta_0, \lambda_0, \epsilon, \rho$; Step Sizes: $\gamma, \alpha_t, \eta_t > 0$ repeat

Sample mini-batch $(q_{t_i}, \text{rel}q_{t_i})_{i=1}^{B}$ from $Q$ $q'_{t_i} \leftarrow \arg\max_{q'} \{\frac{1}{2}\|h_{\theta_t}(\varphi(d^{q'})) - h_{\theta_t}(\varphi(d^q))\|_2^2 - \lambda_t d_Q(q_{t_i}, q')\}, i \in [B]$ $\lambda_{t+1} \leftarrow \max\{0, \lambda_t + \alpha_t \rho(\epsilon - \frac{1}{B}\sum_{i=1}^{B} d_Q(q_{t_i}, q'_{t_i}))\}$ $\theta_{t+1} \leftarrow \theta_t + \eta_t(\frac{1}{B}\sum_{i=1}^{B} \partial_\theta U(\pi_{\theta_t}|q_{t_i}) - \rho(\partial_\theta h_{\theta_t}(q'_{t_i}) - \partial_\theta h_{\theta_t}(q_{t_i}))^T (h_{\theta_t}(q'_{t_i}) - h_{\theta_t}(q_{t_i})))$ until convergence

*FIG. 3A*

Algorithm SenSeI: Sensitive Set Invariance

400 →

401 → inputs: starting point $(\hat{\theta}_0, \hat{\lambda}_0)$, step sizes $(\eta_t)$
repeat

402 → $(X_{t_1}, Y_{t_1}), \ldots, (X_{t_B}, Y_{t_B}) \sim P$ ▷ sample mini-batch from $P$ 403 → $x'_{t_b} \leftarrow \arg\max_{x' \in \mathcal{X}} \{d_y(h_{\hat{\theta}_t}(X_{t_b}), h_{\hat{\theta}_t}(x')) - \hat{\lambda}_t d_x(X_{t_b}, x')\}, b \in [B]$ ▷ generate worst-case examples 404 → $\hat{\lambda}_{t+1} \leftarrow \max\{0, \hat{\lambda}_t - \eta_t \rho(\epsilon - \frac{1}{B}\sum_{b=1}^{B} d_X(X_{t_b}, x'_{t_b}))\}$, 405 → $\hat{\theta}_{t+1} \leftarrow \hat{\theta}_t - \eta_t (\frac{1}{B}\sum_{b=1}^{B} \partial_\theta \{\ell(Y_{t_b}, h_{\hat{\theta}_t}(X_{t_b}))\} + \rho \partial_\theta \{d_y(h_{\hat{\theta}_t}(X_{t_b}), h_{\hat{\theta}_t}(x'_{t_b}))\})$ 406 → until converged

*FIG. 4A*

| | BA.% | S-Con. | GR-Con. | $Gap_G^{RMS}$ | $Gap_R^{RMS}$ | $Gap_G^{max}$ | $Gap_R^{max}$ |
|---|---|---|---|---|---|---|---|
| SenSR | 78.9 | .934 | .984 | .068 | .055 | .087 | .067 |
| Baseline | 82.9 | .848 | .865 | .179 | .089 | .216 | .105 |
| Project | 82.7 | .868 | 1.00 | .145 | .064 | .192 | .086 |
| Adv. debiasing | 81.5 | .807 | .841 | .082 | .070 | .110 | .078 |
| CoCL | 79.0 | - | - | - | .080 | .201 | .109 |
| SenSe I ($p = 40$) | 76.8 | .945 | .963 | .043 | .054 | .053 | .064 |

FIG. 4B

TRAINING INDIVIDUALLY FAIR MACHINE LEARNING ALGORITHMS VIA DISTRIBUTIONALLY ROBUST OPTIMIZATION

BACKGROUND

The present invention relates to the electrical, electronic, and computer arts, and more specifically, to machine learning.

In light of the ubiquity of machine learning (ML) methods in important decision-making and support roles, there is concern about ensuring that ML models are not biased. In response, the ML community has proposed a myriad of formal definitions of algorithmic fairness.

Broadly speaking, there are two types of fairness definitions: group fairness and individual fairness. Although group fairness is amenable to statistical analysis, it suffers from two drawbacks: there are definitions that are mutually incompatible, and there are examples of algorithms that satisfy group fairness but are unfair from individual users' perspectives.

There are few general approaches to enforcing individual fairness. One barrier to broader adoption of individual fairness has been a lack of consensus regarding which users are similar for ML tasks.

SUMMARY

Principles of the invention provide techniques for training individually fair machine learning algorithms via distributionally robust optimization. In one aspect, an exemplary method includes obtaining a first data set, a second data set, and a machine learning model; constructing a sensitive subspace of the first data set that defines a fair metric for distance among elements of the first data set; fairly training the machine learning model on the first data set using a distributionally robust optimization approach based on the fair metric; producing an individually fair set of labels by applying the fairly trained machine learning model to the second data set; and allocating a resource according to the individually fair set of labels.

According to another aspect, an exemplary method includes obtaining a list of objects; obtaining a machine learning model that is partly trained for ranking the list of objects in response to a query; constructing a sensitive subspace of the list of objects that defines a fair metric for distance among the objects; obtaining a set of queries on the list of objects; defining a fair regularizer for the machine learning model as the solution of an optimization problem; solving the optimization problem according to a stochastic algorithm; producing an individually fair ranking of the list of objects, using the fairly trained machine learning model in response to a query; and allocating resources according to the individually fair ranking.

One or more embodiments of the invention or elements thereof can be implemented in the form of a computer program product including a computer readable storage medium with computer usable program code for facilitating the method steps indicated. Furthermore, one or more embodiments of the invention or elements thereof can be implemented in the form of a system (or apparatus) including a memory that embodies computer executable instructions, and at least one processor that is coupled to the memory and operative by the instructions to facilitate exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a tangible computer readable storage medium (or multiple such media) and implemented on a hardware processor, or (iii) a combination of (i) and (ii); any of (i)-(iii) implement the specific techniques set forth herein.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

In view of the foregoing, techniques of the present invention can provide substantial beneficial technical effects. For example, one or more embodiments provide one or more of:

Individual fairness in gradient boosting, including for non-smooth ML models such as gradient-boosted decision trees (GBDTs).

Individually fair ML models that are certifiably fair.

Improved common group and individual fairness while preserving accuracy of classification.

Enforced distributional individual fairness when training smooth ML models.

Trained fair ML models that generalize under standard conditions.

Individually fair ML models for ranking lists of objects.

Fair allocation of resources using ML models that generate individually fair labels or rankings of individuals.

These and other features and advantages of the present invention will become apparent from the following detailed description of illustrative embodiments thereof, which is to be read in connection with the accompanying drawings.

BRIEF DESCRIPTION OF THE DRAWINGS

FIG. 2A depicts in pseudocode an algorithm for individually fair classification in gradient boosted machine learning (GBML) models, according to an exemplary embodiment.

FIG. 2B depicts in pseudocode a stochastic gradient descent algorithm for finding an optimal dual variable in the algorithm of FIG. 2A, according to an exemplary embodiment.

FIG. 2C depicts in pseudocode an algorithm for approximating a solution to the algorithm of FIG. 2A, using the optimal dual variable obtained from FIG. 2B, according to an exemplary embodiment.

FIG. 2D depicts in pseudocode an algorithm for constructing individually fair gradient boosted trees based on the framework presented in FIGS. 2A-2C combined with a gradient-boosted decision tree (GBDT) method, according to an exemplary embodiment.

FIG. 2E presents a table comparing individual fairness and accuracy of an exemplary embodiment to performance of several other training methods for a given machine learning task.

FIG. 3A depicts in pseudocode a stochastic algorithm for training ranking policies that are invariant to certain input perturbations, according to an exemplary embodiment.

FIG. 4A depicts in pseudocode a stochastic algorithm for enforcing distributional individual fairness when training smooth ML models, according to an exemplary embodiment.

FIG. 4B depicts a table comparing accuracy and fairness of several ML models on a standard task, including a model trained according to an exemplary embodiment.

DETAILED DESCRIPTION

One or more embodiments implement an individually fair machine learning model 96 (shown in cloud implementation in FIG. 6, although cloud and/or non-cloud aspects can be employed in one or more embodiments), which provides individually fair classification or ranking of items by machine learning.

Figure 1:
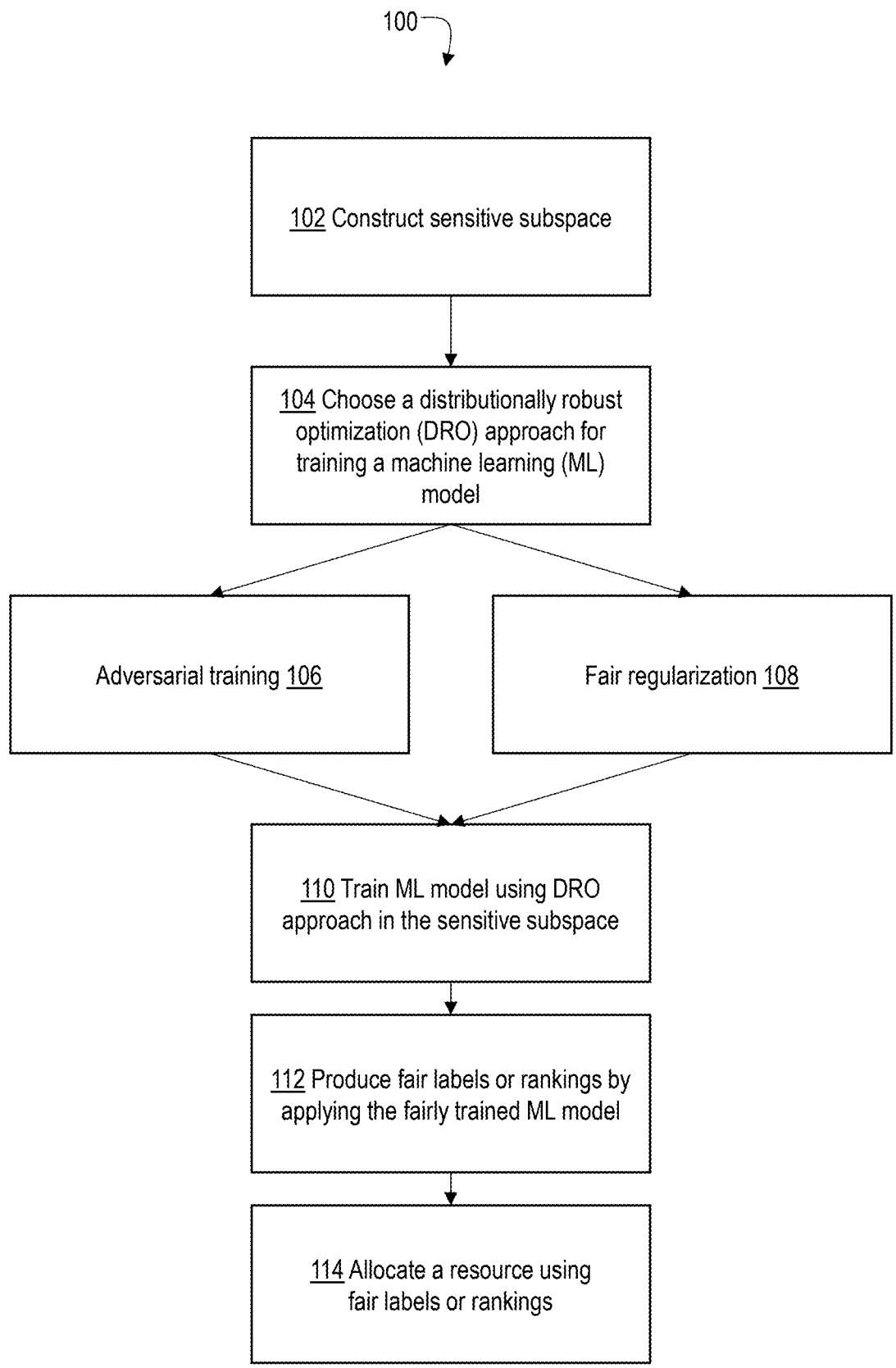
FIG. 1 depicts in a flowchart a method for enforcing individual fairness in machine learning models, according to an exemplary embodiment.

FIG. 1 depicts in a flowchart a general overview of an exemplary embodiment of the invention, which provides a method 100.

At 102, the method 100 includes constructing a sensitive subspace, in which movement changes protected attributes. Thus, a fair metric ignores protected attributes in measuring the difference between data samples and thereby allows for free movement in this space. For tabular data, the sensitive subspace is constructed by training classifiers for the protected attribute(s) and using decision boundaries of the classifiers as sensitive subspace vectors. For text data, the sensitive subspace is constructed by choosing word embeddings that should be treated similarly, applying support vector decomposition, and using the top singular vectors as sensitive subspace vectors. For image data, the sensitive subspace is constructed by choosing a GAN architecture and mapping images to GAN latent space, then training latent vector classifiers for the protected attributes in the latent space and using their decision boundaries as sensitive subspace vectors.

At 104, choose a distributionally robust optimization (DRO) approach for training a machine learning (ML) model. The DRO approach can be chosen, for example, based on differentiability of the model, size of the data set, and whether the ML model is to be used for labeling or ranking tasks. The DRO approach can include adversarial training 106 or fair regularization 108. These two approaches are further discussed below.

At 110, train the ML model using the selected DRO approach in the sensitive subspace. At 112, apply fair labels using the fairly trained ML model. At 114, allocate resources according to the fair labels. For example, in one or more embodiments, allocating resources may include controlling distribution of at least one of electrical power, water, and computing resources in accordance with the transformed probabilistic scores that satisfy the fairness constraints while minimizing the loss in utility. For example, in FIG. 7 (discussed below), send signals over network adapter 20 to control cloud resources shown in FIGS. 1 and 2, electrical switch bank 51, or fluid valve network 53.

In one or more embodiments of the invention, let $\mathcal{X}$ be the space of inputs and $\mathcal{Y}$ be the space of possible outputs (labels). For discussion, assume $\mathcal{Y}=\{0,1\}$; the invention is extensible to other discrete sets of outcomes. A machine learning model or predictor is a function h: $\mathcal{X} \rightarrow \mathcal{Y}$ in a space of functions $\mathcal{H}$ (e.g., the set of all neural nets, or of neural nets with a certain architecture). Define $\mathcal{Z}=\mathcal{X}\times\mathcal{Y}$, and equip $\mathcal{Z}$ with a fair metric $d_x$ that measures the similarity between inputs, ignoring any sensitive dimensions. A model or predictor h can be called "individually fair" if it is L-Lipschitz continuous with reference to appropriate metrics on $\mathcal{X}$ and $\mathcal{Y}$, e.g.:

$$d_y(h(x),h(x')) \leq L d_x(x,x')$$

for all x,x'531 $\mathcal{X}$. The choice of dy is often determined by the form of the output. For example, if the ML model outputs a vector of logits, then the Euclidean norm may be suitable as $d_y$. The metric $d_x$ encodes intuition of which inputs should be "similar" for the ML task at hand, i.e., which dimensions should make up the distance metric and which should be left out. In other words, the metric dx encodes a sensitive subspace of protected attributes, and implies that movement along vectors in that subspace should not affect the results of an ML model.

For tabular data, one or more embodiments train classifiers for the protected attribute and use their decision boundaries as sensitive subspace vectors. For text data, one or more embodiments choose word embeddings that should be treated similarly, apply support vector decomposition, and use the top singular vectors as sensitive subspace vectors. For image data, one or more embodiments choose a generative adversarial network (GAN) architecture and map images to GAN latent space, then train latent vector classifiers for the protected attributes in the latent space and use their decision boundaries as sensitive subspace vectors.

One or more embodiments then choose a distributionally robust optimization (DRO) approach, and train a fresh classifier accordingly.

One or more embodiments provide and implement individually fair gradient boosted machine learning (GBML) models, according to an algorithm 200 as shown in FIG. 2A. The goal is to use gradient boosting to learn a predictor h: $\mathcal{X} \rightarrow \mathcal{Y}$ from the class of predictors $\mathcal{H}$ such that $h(x_1)$ approaches $h(x_2)$ whenever $d_x(x_1,x_2)$ is small. A ML model can be trained to accomplish individually fair classification using a robust population loss function L: $\mathcal{H} \rightarrow \mathbb{R}$ that penalizes violations of individual fairness constraints as well as poor predictive performance. To achieve individually fair GBML, functional gradient descent can be applied to the robust loss function L in order to obtain the desired gradient boosting technique.

Let $\ell: \mathcal{H}\times\mathcal{Z} \rightarrow \mathbb{R}$ denote a convex, differentiable loss function that measures performance of a predictor $\mathcal{H}$ on training data $\mathcal{D}=\{(x_i,y_i)\}_{i=1}^n$. Then L searches for fairness violations in a predictor h by comparing the results of h for inputs x and x' that are distinguished by a perturbation that is small in all dimensions except the protected dimensions. In other words, the robust loss L uses the loss function $\ell$ to measure similarity between predictions h(x) and h(x').

To allow construction of an arbitrary (potentially discontinuous or non-differentiable) fair classifier h via gradient boosting, the nature of allowed perturbations is restricted so that inputs represented in $\mathcal{D}$ can only be perturbed to other inputs in $\mathcal{D}$.

Then let $\mathcal{P}_n$ be the empirical distribution on $\mathcal{D}$ and let $\mathcal{D}_0 = \{x_1, \ldots, x_n\} \times \mathcal{Y} \times \mathcal{Z}$. Additionally, consider a cost function c on $\mathcal{Z} \times \mathcal{Z}$, defined by $$c((x_1, y_1), (x_2, y_2)) = d_x^2(x_1, x_2) + \infty \cdot 1_{\{y_1 \neq y_2\}}.$$

Then, $c((x_1, y_1), (x_2, y_2))$ is small whenever $x_1$ and $x_2$ are comparable and $y_1 = y_2$. Thus, c provides a cost for perturbing inputs without disturbing their labels. Let $W_D(Q, P)$ be the 1-Wasserstein distance between distributions $Q$ on $\mathcal{D}$ and P on $\mathcal{D}_0$, according to the cost function c. Given a budget $\varepsilon$, every distribution $Q$ that satisfies $W_D(Q, P) \leq \varepsilon$ represents perturbing the training inputs from their original locations (specified by the empirical distribution $P_n$) to training points that are nearby according to the fair metric (neglecting offsets along sensitive dimensions). Thus, the robust loss function L(f) is given by $$L(f) = \sup_{Q:W_D(Q,P_n) \leq \epsilon} \mathbb{E}_Q[\ell(f, \mathcal{Z})],$$

where $\mathbb{E}_Q$ is an expected value on the distribution of data Q.

To force the robust loss L to audit for fairness, perturbations of inputs x are allowed only to the point that the inputs do not change their labels y. Given an input $x_1$ with true outcome $y_1$ find a nearby input $x_1'$ such that $h(x_1')$ is as different as possible from $y_1$ (as measured by the training loss $\ell$). When $\ell(h, (x_i', y_i)) > \ell(h, (x_i, y_i))$, this indicates unfairness in the candidate predictor h because $x_i$ and $x_i'$ are comparable and intuitively should be assigned the same label $y_i$, but $h(x_i')$ is further than $h(x_i)$ from $y_i$. The robust loss function L uses the supremum over distributions to aggregate the worst areas of unfairness.

The individually fair loss function L can be used for gradient boosting by evaluating the derivatives $$\frac{\partial L}{\partial h(x_i)} = \frac{\partial}{\partial h(x_i)} \sup_{Q:W_D(Q,P_n) \leq \epsilon} \mathbb{E}[\ell(h, \mathcal{Z})] = \sum_{y=0}^{1} \sum_{k=1}^{n} \frac{\partial}{\partial h(x_i)} \ell(h, (x_k, y)) P^*(\{(x_k, y)\})$$

where P* is a distribution that attains the supremum. Proceeding from the presumed convexity of $\ell$, calculate these derivatives by first determining the optimal distribution $$P^* \in \operatorname{argmax}_{P:W_D(P,P_n) \leq \epsilon} \mathbb{E}[\ell(h, \mathcal{Z})]$$

and then computing derivatives of $\mathbb{E}_{P^*}[\ell(h, \mathcal{Z})]$. Then for boosting, find P*.

P* can be found in terms of a linear program. Since $W_D$ is a discrete Wasserstein distance, if $c(z_i, z_j) = \infty$ for any $z_i \in \mathcal{D}_0$ and $z_j \in \mathcal{D}$, then any weight at $z_j$ cannot be transported to $z_i$. Thus, focus the program on pairs $(z_i, z_j) \in \mathcal{D}_0 \times \mathcal{D}$ with $c(z_i, z_j) < \infty$.

Then, let $C \in \mathbb{R}^{n \times n}$ be the matrix with entries given by $C_{i,k} = c((x_i, y_k), (x_k, y_k)) = d_x^2(x_i, x_k)$. Define class indicator vectors by $$y_j^1 = \begin{cases} 1 & : y_j = 1 \\ 0 & : y_j = 0 \end{cases} \text{ and } y^0 = 1_n - y^1$$

for all $y_j \in \mathcal{D}$. Then for any distribution P on $\mathcal{D}_0$, let $P_{i,k} = P(\{(x_i, k)\})$ for $k \in \{0,1\}$. The condition that $W_D(P, P_n) \leq \varepsilon$ is implied by the existence of matrix $\Pi$ such that 1. $\Pi \in \Gamma$ with $\Gamma = \left\{ \Pi \mid \Pi \in R_+^{n \times n}, \langle C, \Pi \rangle \leq \epsilon, \Pi^T \cdot 1_n = \frac{1}{n} 1_n \right\}$ 2. $\Pi \cdot y^1 = (P_{1,1}, \ldots, P_{n,1})$, and $\Pi \cdot y^0 = (P_{1,0}, \ldots, P_{n,0})$.

The matrix $R \in \mathbb{R}^{n \times n}$ can be further defined by $R_{i,j} = \ell(h, (x_i, y_j))$, which is the loss incurred if point j with label $y_j$ is located at point i. Then given this setup and a current predictor h, it is possible to obtain solution $\Pi^*$ to the optimization problem as the solution to a linear program (in $n^2$ variables)

$$\Pi^* \in \arg\max_{\Pi \in \Gamma} \langle R, \Pi \rangle.$$

Then an optimal distribution P* on $\mathcal{D}_0$ is given by $P^*(\{(x_i, k)\}) = (\Pi^* \cdot y^k)_i$, according to the exemplary algorithm 200 shown in FIG. 2A. Input, as indicated, is obtained at 201. At 202, define the cost matrix C. At 203, enter an iterative loop on t. At 204, define the loss matrix $R_t$. At 205, find $\Pi^*_t$. At 206, assign the distribution $P_{t+1}$. At 207, fit a base learner to pseudo-residuals of the loss function L. At 208, update candidate classifier $h_{t+1}$. At 209, repeat the loop until t reaches T−1. Then at 210, return $f_T$.

Advantageously, in the algorithm 200, based on the formalisms above, the class of predictors $\mathcal{H}$ can include discontinuous functions, such as decision trees or sums of decision trees. Therefore, individually fair gradient boosting can be applied to any class of base classifiers, including those lacking Lipschitz continuity.

FIG. 2B depicts in pseudocode a stochastic gradient descent algorithm 220 for finding an optimal dual variable $\eta^*$ in the algorithm of FIG. 2A, according to an exemplary embodiment. At 221, gather input data including a starting value $\eta_1$, a cost matrix C, a loss matrix R, a tolerance $\varepsilon$, a batch size B, and steps sizes $\alpha_t > 0$. At 222, enter a conditional loop that repeats until convergence. At 223, sample indices, $j_i, \ldots, j_B$ randomly from $\{1, \ldots, n\}$ where n is the size of R. At 224, retrieve columns $R_r$ and $C_r$, corresponding to indices j, from loss matrix R and cost matrix C. At 225 and 226, update the dual variable $\eta_r$. At 227, repeat the loop until $\eta_t$ converges.

FIG. 2C depicts in pseudocode an algorithm 240 for approximating a solution $\Pi^*$ to the algorithm of FIG. 2A, using the optimal dual variable $\eta^*$ obtained from FIG. 2B, according to an exemplary embodiment. At 241, input cost matrix C, loss matrix R, and dual variable $\eta^*$. At 242, initialize $\Pi$ as an n×n matrix of zeros. At 243, enter an iterative loop. At 244, obtain an index t for column j, based on the row i that maximizes the difference between the loss matrix R and the cost matrix C. At 245, select an element of $\Pi$, based on the t value returned by step 244, and set the selected element of $\Pi$ equal to 1/n. At 246, exit the iterative loop. At 247, return $\Pi$, the approximation of $\Pi^*$.

FIG. 2D depicts in pseudocode an algorithm 260 for constructing individually fair gradient boosted trees based on the framework presented in FIGS. 2A-2C combined with a gradient-boosted decision tree (GBDT) method, according to an exemplary embodiment. At 261, input data $\mathcal{D}$, a perturbation budget $\varepsilon$, a loss function $\ell$, a fair metric $d_x$, a number of boosting steps T, gradient-boosted decision tree parameters ρ, and a batch size B. At 262, initialize data $\mathcal{D}$. At 263, define the cost matrix C. At 264, obtain an initial value of a machine learning model f by running one step of naïve boosting on the decision tree. At 265, enter an iterative loop of boosting steps. At 266, define the loss matrix R. At 267, implement algorithm 220. At 268, implement algorithm 240. At 269, update weights $w_t$ of this iteration of a candidate machine learning model. At 270, further update the candidate machine learning model $f_t$ according to a gradient-boosted descent algorithm. At 271, exit the iterative loop. At 272, return the final machine learning model $f_T$.

As an example of some benefits of the algorithms 200, 220, 240, 260, consider a machine learning task to label individuals as good or bad credit risks. Some attributes of the individuals are protected and should not affect the final labels. A sensitive subspace is constructed by fitting the data to predict a first protected attribute. This subspace also is used for data preprocessing in which the individuals' attributes are projected to omit the first protected attribute. Then individual fairness is tested by varying a second protected attribute (e.g., "Status-cons"). FIG. 2E presents in a table 280 the results of several algorithms that attempt to enforce individual fairness. "BuDRO" corresponds to algorithm 260. "BAcc" represents balanced accuracy of labeling. "Baseline" is a gradient-boosted decision tree using a conventional methodology. "Project" is a decision tree for which data has been preprocessed by projection to omit the protected attributes. "Baseline NN" is a plain neural network operating on the raw data without preprocessing. Decision trees and neural networks are two exemplary types of machine learning model. Generally, a decision tree is a branching model of nested conditional statements, implemented in one or more processors. A neural network includes a plurality of computer processors that are configured to work together to implement one or more machine learning algorithms. The implementation may be synchronous or asynchronous. In a neural network, the processors simulate thousands or millions of neurons, which are connected by axons and synapses. Each connection is enforcing, inhibitory, or neutral in its effect on the activation state of connected neural units. Each individual neural unit has a summation function which combines the values of all its inputs together. In some implementations, there is a threshold function or limiting function on at least some connections and/or on at least some neural units, such that the signal must surpass the limit before propagating to other neurons. A neural network can implement supervised, unsupervised, or semi-supervised machine learning.

It is apparent that BuDRO (algorithm 260) is more effective at improving individual fairness with minimal impact on accuracy of labeling.

One or more embodiments provide individually fair ranking of a list of items. A fair ranking problem can be solved by training ranking policies that are invariant under certain sensitive perturbations to ranking queries, according to an exemplary algorithm 300 as shown in FIG. 3A. For example, individually fair ranking can be enforced via the following optimization problem:

$$\pi^* \triangleq \arg\max_\pi \mathbb{E}_{q \sim Q}[U(\pi|q)] - \rho R(\pi),$$

where U is the utility of policy $\pi$ for query q as an element of the query distribution Q, $\mathbb{E}_{q \sim Q}$ is an expected value on query q, $\rho > 0$ is a regularization parameter and $$R(\pi) \triangleq \begin{cases} \sup_{\Pi \in \Delta(Q \times Q)} & \mathbb{E}_\Pi[d_R(\pi(\cdot \mid q), \pi(\cdot \mid q'))] \\ \text{subject to} & \mathbb{E}_\Pi[d_Q(q, q')] \leq \epsilon \\ & \Pi(\cdot, Q) = Q \end{cases}$$

is an invariance regularizer, where $d_Q$ is a metric on query distribution $Q$ and $d_R$ is a metric on distributions of ranking—the distance between outputs of fair ranking for original queries q and perturbed queries q', e.g., as measured by squared differences of scores for each item in each query. In a learning-to-rank (LTR) context of machine learning, queries typically correspond to a set of items that need to be ranked. $d_Q$ can be defined using the machinery of optimal transport to specify an appropriate metric on queries viewed as sets of items.

An appropriately fair metric identifies as close to each other all items that differ only by sensitive or protected descriptors. Learning a fair metric is an important problem. In one or more embodiments, learning can be shortcut by applying expert judgment to identify the sensitive or protected descriptors and exclude them from the metric. Then an optimal transport distance between queries q and q', using the fair metric, has the transport cost:

$$d_Q(q, q') \triangleq \begin{cases} \inf_{\Pi \in \Delta(X \times X)} & \int_{X \times X} d_X(x, x') d\Pi(x, x') \\ \text{subject to} & \Pi(\cdot, X) = \frac{1}{n}\sum_{j=1}^n \delta_\varphi(d_j^q) \\ & \Pi(X, \cdot) = \frac{1}{n}\sum_{j=1}^n \delta_\varphi(d_j^{q'}) \end{cases}$$

where $X$ is the space of item representations and $\delta$ is the Dirac delta function.

If $d_R(\pi(\cdot|q), \pi(\cdot|q')) - \lambda d_Q(q, q')$ is continuous in (q,q') for all $\lambda$, then the invariance regularizer R can be written as $$R(\pi) = \inf_{\lambda \geq 0}\{\lambda \epsilon + \mathbb{E}_{q \sim Q}[r_\lambda(\pi, q)]\}, \text{ where}$$

$$r_\lambda(\pi, q) = \sup_{q' \in Q}\{d_R(\pi(\cdot|q), \pi(\cdot|q')) - \lambda d_Q(q, q')\}.$$

To compute $r_\lambda(\pi, q)$, use gradient ascent on $u(q'|\pi, q, \lambda) \triangleq d_R(\pi(\cdot|q), \pi(\cdot|q')) - \lambda d_Q(q, q')$. Start by computing the gradient of $d_Q(q, q')$ with reference to $x' = \varphi(d^{q'})$, where $x = \varphi(d^q)$. Let $\Pi^*(q, q')$ be the optimal transport plan for the problem defining $d_Q(q, q')$:

$$d_Q(q, q') = \int_{X \times X} d_X(x, x') d\Pi^*(x, x') d\Pi^*(x, x'),$$

$$\Pi^*(\cdot, X) = \frac{1}{n}\sum_{j=1}^n \delta_{\varphi(d_j^q)}, \Pi^*(X, \cdot) = \frac{1}{n}\sum_{j=1}^n \delta_{\varphi(d_j^{q'})}.$$

Consider $\Pi^* = \Pi^*(q, q')$ as a coupling matrix, where $\Pi^*_{i,j} = \Pi^*(\varphi(d_i^q), \varphi(d_j^{q'}))$. Using this notation, $$\partial_{x'_j} d_Q(q, q') = \sum_{i=1}^n \Pi^*_{i,j} \partial_2 d_X(\varphi(d_i^q), \varphi(d_j^{q'})),$$

where $\partial_2 d_X$ denotes the derivative of $d_X$ with reference to its second input. Then set $$d_R(\pi(\cdot \mid q), \pi(\cdot \mid q')) = \frac{1}{2}\|h_\Theta(\varphi(d^q)) - h_\Theta(\varphi(d^{q'}))\|_2^2.$$

Under this choice of $d_R$ and using the previous equation, a single iteration of gradient ascent with step size $\gamma$ for x' is $$x_j'^{(l+1)} = x_j'^{(l)} + \gamma \left( \partial_{x_j'} h_\theta(x'^{(l)}) \right)^T \left( h_\theta(x'^{(l)}) - h_\theta(x) \right) - \lambda \sum_{i=1}^n \Pi_{i,j}^* \partial_2 d_\mathcal{X}(x_i, x_j'^{(l)}) \right).$$

Accordingly, an alternating stochastic algorithm 300, as shown in FIG. 3A, can be applied to solve the optimization problem in π* stated above. The algorithm 300 takes as input some initial weights $\theta_0$ for the model used for ranking, as well as initial values $\lambda_0$ for the scope of constraints on distance between $q'_t$ and q. Additional inputs include $\epsilon$ and $\rho$; with step sizes $\gamma, \alpha_t, \eta_t > 0$. At 301, enter a conditional loop that continues until convergence. At 302, sample a mini-batch from the space of queries $\mathcal{Q}$. At 303, generate $q'_t$ by maximizing a difference in scoring between $q'_t$ and q while penalizing distance between $q'_t$ and q in the fair metric. At 304, update $\lambda$. At 305, update $\theta$. At 306, exit the loop when convergence is achieved. Convergence conditions for stochastic algorithms are well known to ordinary skilled workers, and it is well-known that even if a stochastic algorithm operates on a non-convex function, the algorithm will converge globally to a stationary point.

Figure 3B:
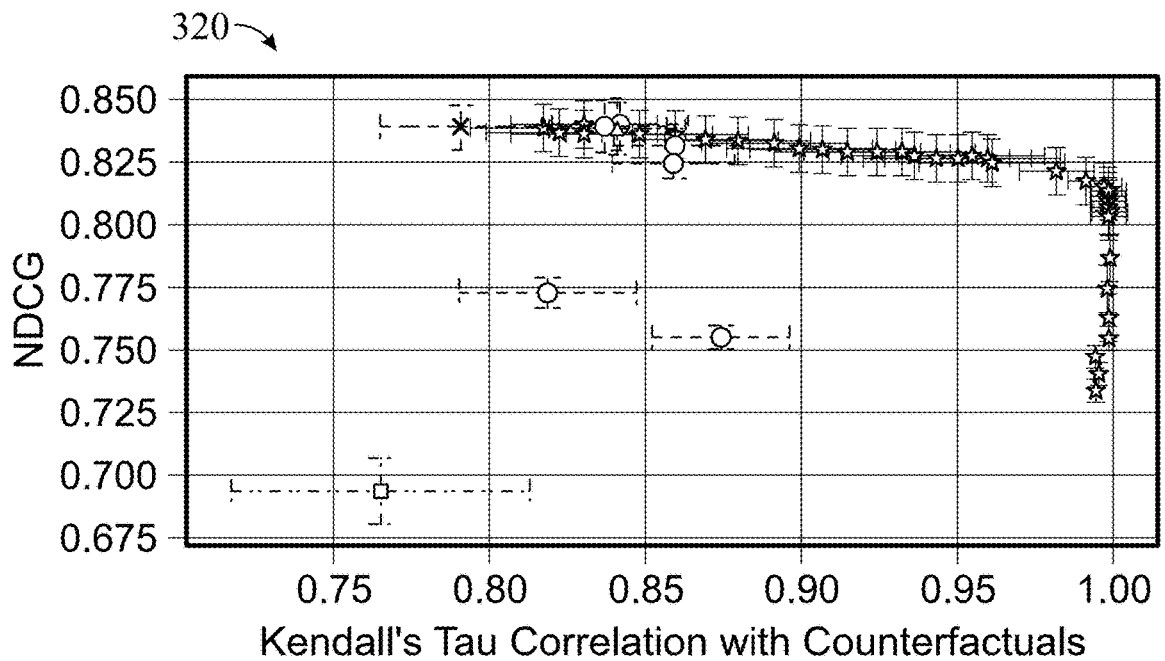
FIG. 3B presents a graph comparing individual fairness of an exemplary embodiment to performance of several other training methods for a given machine learning task.
Figure 3C:
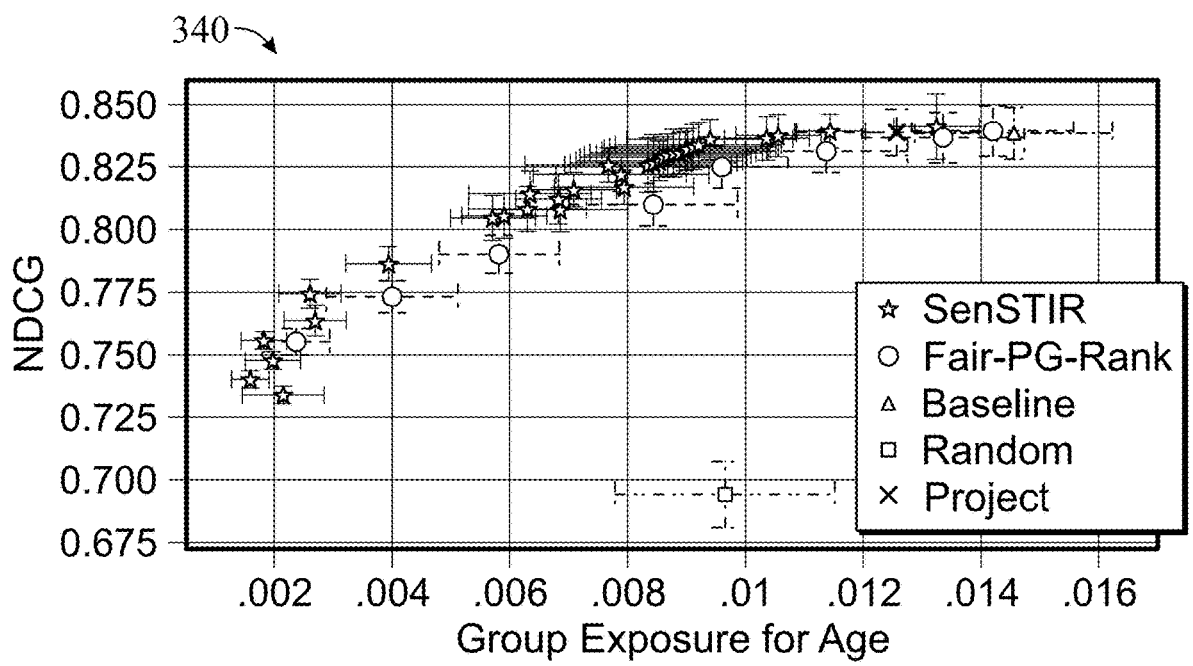
FIG. 3C presents a graph comparing group fairness of an exemplary embodiment to performance of several other training methods for a given machine learning task.

Referring again to the example task to label individuals as good or bad credit risks, algorithm 300 performs well. FIG. 3B depicts a graph 320 that compares the NDCG (normalized discounted cumulative gain) measure of individual fairness for algorithm 300 ("SenSTIR") to "Baseline" (conventional training without enforcing fairness), "Project" (data pre-processed by projecting it onto an orthogonal component of the sensitive thereby ignoring the protected attribute, then using conventional training), "Fair-subspace, PG-Rank" (a recent approach for training fair learning-to-rank models), and "Random" (randomly sampling linear weights from a standard normal distribution). FIG. 3C depicts a graph 340 that makes the same comparisons for the NDCG measure of group fairness.

One or more embodiments enforce distributional individual fairness when training smooth ML models, according to a stochastic optimization algorithm 400 as shown in FIG. 4A. This is accomplished, in a broad view, by removing the Lipschitz-continuity constraint to a space of probability distributions in $\mathcal{X}$ to obtain a version of individual fairness that can be enforced by minimizing a data-dependent regularizer R(h).

$$R(h) \triangleq \begin{cases} sup_{\Pi \in \Delta(\mathcal{X} \times \mathcal{X})} & \mathbb{E}_\Pi[dy(h(x), h(x'))] \\ \text{subject to} & \mathbb{E}_\Pi[dx(x, x')] \le \varepsilon \\ & \Pi(\cdot, \mathcal{X}) = P_X \end{cases}$$

where $P_X$ is the marginal distribution of the inputs to the ML task at hand and $\mathbb{E}_\Pi$ is an expected value on a distribution of inputs and outputs that solves R(h). The ML model h is $(\varepsilon, \delta)$-distributionally individually fair if and only if $R(h) \le \delta$. The definition of R (measurement of fairness) does not depend on distribution of the labels $P_{Y|X}$, so it does not depend on accuracy of the ML model.

Thus, advantageously, it is possible to fine-tune a trade-off between goodness-of-fit and fairness by adjusting coefficient ρ in $$min_{h \in \mathcal{H}} L(h) + \rho R(h), L(h) \triangleq \mathbb{E}[\ell(y, h(x))]$$

where ρ is a regularization parameter and R is as defined above. By appealing to duality, it is possible to produce a formation of R that is suitable for stochastic optimization:

$$R(h) = \inf_{\lambda \ge 0} \{\lambda \varepsilon + \mathbb{E}_{P_x}[r_\lambda(h,x)]\},$$

$$r_\lambda(h,x) \triangleq \sup_{x' \in \mathcal{Z}, 22}\{dy(h(x), h(x')) - \lambda dx(x,x')\}.$$

Then the regularized risk minimization problem is equivalently:

$$\min_{h \in \mathcal{H}} \inf_{\lambda \ge 0} \mathbb{E}_P[\ell(Y, h(x)) + \rho(\lambda \varepsilon + r_\lambda(h, x))].$$

To optimize with reference to h, parameterize the function space $\mathcal{H}$ with a parameter $\theta \in \Theta \subset \mathbb{R}^d$ and consider a stochastic approximation approach to finding the best parameter. Let $w \triangleq (\theta, \lambda)$ and $Z \triangleq (X, Y)$. Then the stochastic optimization problem is $$\min_{w \in \Theta \times \mathbb{R}} F(w) \triangleq \mathbb{E}_P[f(w, Z)],$$

$$f(w, Z) \triangleq \ell(Y, h_\theta(x)) + \rho(\lambda \varepsilon + r_\lambda(h_\theta, x)).$$

This problem is solved according to algorithm 400, shown in FIG. 4A. At 401, enter a conditional loop that continues until convergence. At 402, sample a mini-batch from P, the distribution of inputs x. At 403, generate worst-case counterfactuals $x'_t$ for each $x_t$ by maximizing a difference in scores $h(x'_t) - h(x_t)$ while constraining the distance between $x_t$ and $x'_t$ along the fair metric according $\hat{\lambda}$. At 404, update $\hat{\lambda}$ according to gradient descent on the dual of the fair regularizer. At 405, update $\hat{\theta}$ according to gradient descent on the loss function and the dual of the fair regularizer.

At 406, exit the loop when convergence is achieved. Convergence conditions for stochastic algorithms are well known to ordinary skilled workers, and it is well-known that even if a stochastic algorithm operates on a non-convex function, the algorithm will converge globally to a stationary point.

FIG. 4B presents a table 420 that compares accuracy as well as group and individual fairness, among several algorithms including algorithm 400 ("SenSEI"), on a machine learning task of predicting a person's annual income from information about the person. It will be appreciated that although the balanced accuracy ("BA, %") for SenSEI is the lowest among the six algorithms tested, the individual fairness measure of S-Con and the group fairness measures are best for SenSEI.

Given the discussion thus far, and with reference to the accompanying drawings, it will be appreciated that, in general terms, an exemplary method, according to an aspect of the invention, includes obtaining a first data set, a second data set, and a machine learning model; at 102, constructing a sensitive subspace of the first data set that defines a fair metric for distance among elements of the first data set; at 110, fairly training the machine learning model on the first data set using a distributionally robust optimization approach based on the fair metric; at 112, producing an individually fair set of labels by applying the fairly trained machine learning model to the second data set; and at 114, allocating a resource according to the individually fair set of labels. For example, in one or more embodiments, allocating resources may include dispatching a vehicle to pick up a first labeled individual who might not otherwise have been picked up (e.g., if labeling was done without using aspects of the invention). In one or more embodiments, allocating resources may include assigning cloud compute resources to a first labeled individual who might not otherwise have received the resources (e.g., if labeling was done without using aspects of the invention).

In one or more embodiments, fairly training the machine learning model comprises: at 202, defining a cost matrix C for the model, then at 203, entering an iterative loop. The method further includes, in the loop: at 204, defining an iteration of a loss matrix R; at 205, finding a solution to an optimization problem by executing a linear program on the iteration of the loss matrix; at 206, assigning a distribution for inputs and outputs of the model, based on the solution to the optimization problem; at 207, fitting a base learner to pseudo-residuals of a loss function of the model, based on the distribution for inputs and outputs of the model; and at 208, updating a candidate classifier of the model, based on the loss function. Then at 209, repeat the loop until a final iteration produces a finally updated candidate classifier; and at 210, return the finally updated candidate classifier as the fairly trained model.

In one or more embodiments, updating the candidate classifier comprises applying a gradient boosted descent algorithm to a decision tree of the model.

In one or more embodiments, the loss matrix R is defined as $R_{i,j} = \ell(h,(x_i, y_j))$.

In one or more embodiments, a cost function of the cost matrix is defined as $$c((x_1,y_1),(x_2,y_x)) = d_x^2(x_1,x_2) + \infty \cdot 1_{\{y_1 \neq y_2\}}.$$

In one or more embodiments, the loss function of the model is defined as $$L(f) = \sup_{Q: W_{\mathcal{D}}(Q,P_n) \leq \epsilon} \mathbb{E}_Q[\ell(f, \mathcal{Z})].$$

In one or more embodiments, fairly training the machine learning model on the first data set comprises using a regularization approach based on the fair metric.

In one or more embodiments, the regularization approach includes: defining a fair regularizer for the machine learning model as the solution of an optimization problem; and at 401, entering a conditional loop that continues until convergence of a stochastic algorithm for solving the optimization problem. The regularization approach further includes, in the loop: at 402, sampling a mini-batch from the first data set x and from a corresponding first label set; at 403, generating counterfactual data x' by maximizing a difference in score from each $x_t$ of x to each $x'_t$ of x', within constraints λ such that distance between x and x' is minimized; at 404, updating the constraints λ using a gradient descent technique, setting λ no less than zero; and at 405, updating weights θ of the machine learning model using a gradient descent technique. Then at 406, exit the loop when the updated weights θ converge to produce the fairly trained machine learning model; and return the fully trained machine learning model.

In one or more embodiments, the fair regularizer R(h) is defined as $$R(h) \triangleq \begin{cases} \sup_{\Pi \in \Delta(\mathcal{X} \times \mathcal{X})} & \mathbb{E}_\Pi[dy(h(x), h(x'))] \\ \text{subject to} & \mathbb{E}_\Pi[dx(x, x')] \leq \epsilon \\ & \Pi(\cdot, \mathcal{X}) = P_X \end{cases}.$$

In one or more embodiments, the dual of the fair regularizer is defined as $R(h) = \inf_{\lambda \geq 0}\{\lambda \epsilon + \mathbb{E}_{P_x}[r_\lambda(h,x)]\},$ $r_\lambda(h,x) \triangleq \sup_{x' \in \mathcal{X}} \{dy(h(x),h(x')) - \lambda dx(x,x')\},$ where $\mathbb{E}_{P_x}$ is an expected value on a marginal distribution of a data distribution that solves R(h).

In one or more embodiments, the constraints λ are updated based on the gradient of the dual of the fair regularizer with respect to λ.

In one or more embodiments, the weights θ are updated based on the gradient of the loss function plus the gradient of the dual of the fair regularizer with respect to θ.

According to another aspect, a method for fair ranking and allocation comprises: obtaining a list of objects; obtaining a machine learning model that is partly trained for ranking the list of objects in response to a query; at 102, constructing a sensitive subspace of the list of objects that defines a fair metric for distance among the objects; at 110, obtaining a set of queries on the list of objects; defining a fair regularizer for the machine learning model as the solution of an optimization problem; and solving the optimization problem according to a stochastic algorithm; at 112, producing an individually fair ranking of the list of objects, using the fairly trained machine learning model in response to a query; and at 114, allocating resources according to the individually fair ranking. For example, in one or more embodiments, allocating resources may include controlling distribution of at least one of electrical power, water, and computing resources in accordance with the transformed probabilistic scores that satisfy the fairness constraints while minimizing the loss in utility. For example, in FIG. 7 (discussed below), send signals over network adapter 20 to control cloud resources shown in FIGS. 5 and 6, electrical switch bank 51, or fluid valve network 53. As noted, in one or more embodiments, allocating resources may include dispatching a vehicle to pick up a first labeled individual who might not otherwise have been picked up (e.g., if labeling was done without using aspects of the invention). In one or more embodiments, allocating resources may include assigning cloud compute resources to a first labeled individual who might not otherwise have received the resources (e.g., if labeling was done without using aspects of the invention).

In one or more embodiments, the stochastic algorithm comprises, at 301, entering a conditional loop that continues until convergence of the stochastic algorithm for solving the optimization problem. The method further includes, in the loop: at 302, sampling a mini-batch from the set of queries q; at 303, generating a set of counterfactual queries $q'_t$ by minimizing distance on the fair metric between each $q_t$ of the set of queries and each $q'_t$ of the set of counterfactual queries, while maximizing difference between a score of each item in $q_t$ and a corresponding score of each item in $q'_t$; at 304, updating constraints λ on the distance between $q_t$ and $q'_t$ according to a gradient descent technique on the gradient of the dual of the fair regularizer; and at 305, updating weights θ of the machine learning model according to a gradient descent technique on the sum of the loss function and the gradient of the dual of the fair regularizer. Then at 306, exit the loop when the updated weights θ converge to produce a fairly trained machine learning model for ranking a list;

In one or more embodiments, the dual of the fair regularizer R(π) is $R(\pi) = \inf_{\lambda \geq 0}\{\lambda \epsilon + \mathbb{E}_{q \sim Q}[r_\lambda(\pi,q)]\}$, where $r_\lambda(\pi,q) = \sup_{q' \in Q} \{d^{\mathbb{R}}(\pi(\cdot|q),\pi(\cdot|q')) - \lambda d_Q(q,q')\}.$ One or more embodiments of the invention, or elements thereof, can be implemented in the form of an apparatus including a memory and at least one processor that is coupled to the memory and operative to perform exemplary method steps, or in the form of a non-transitory computer readable medium embodying computer executable instructions which when executed by a computer cause the computer to perform exemplary method steps.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
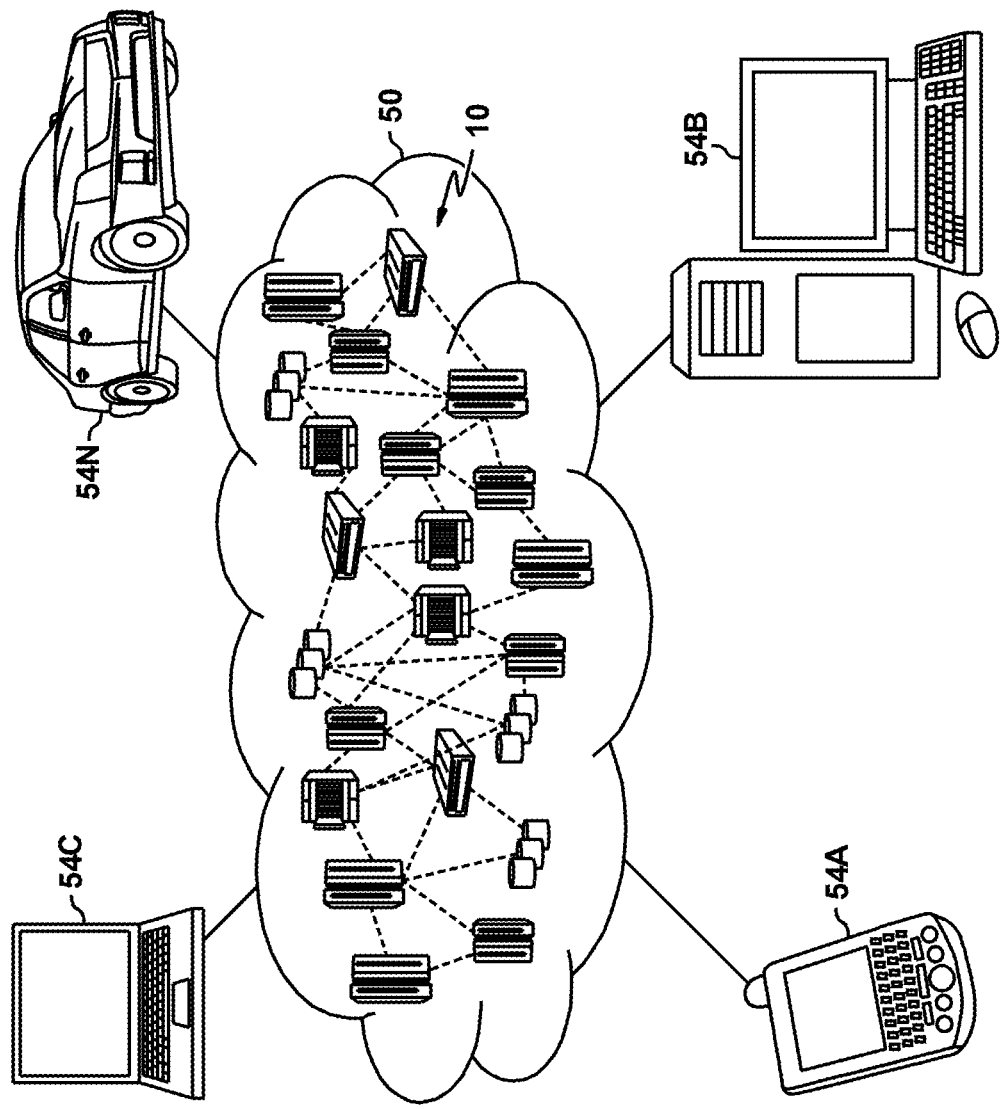
FIG. 5 depicts a cloud computing environment according to an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
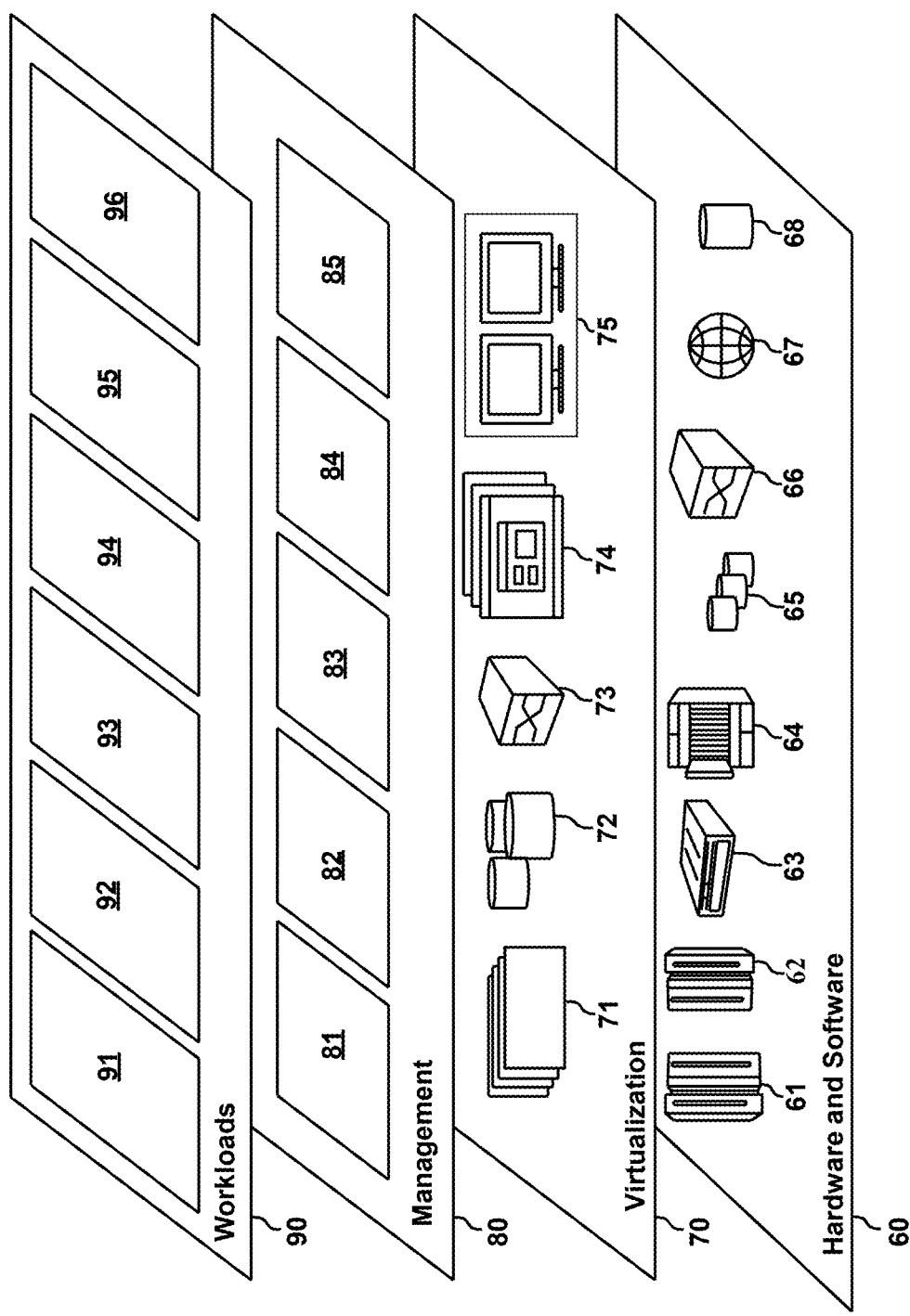
FIG. 6 depicts abstraction model layers according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and the individually fair machine learning model 96.

Figure 7:
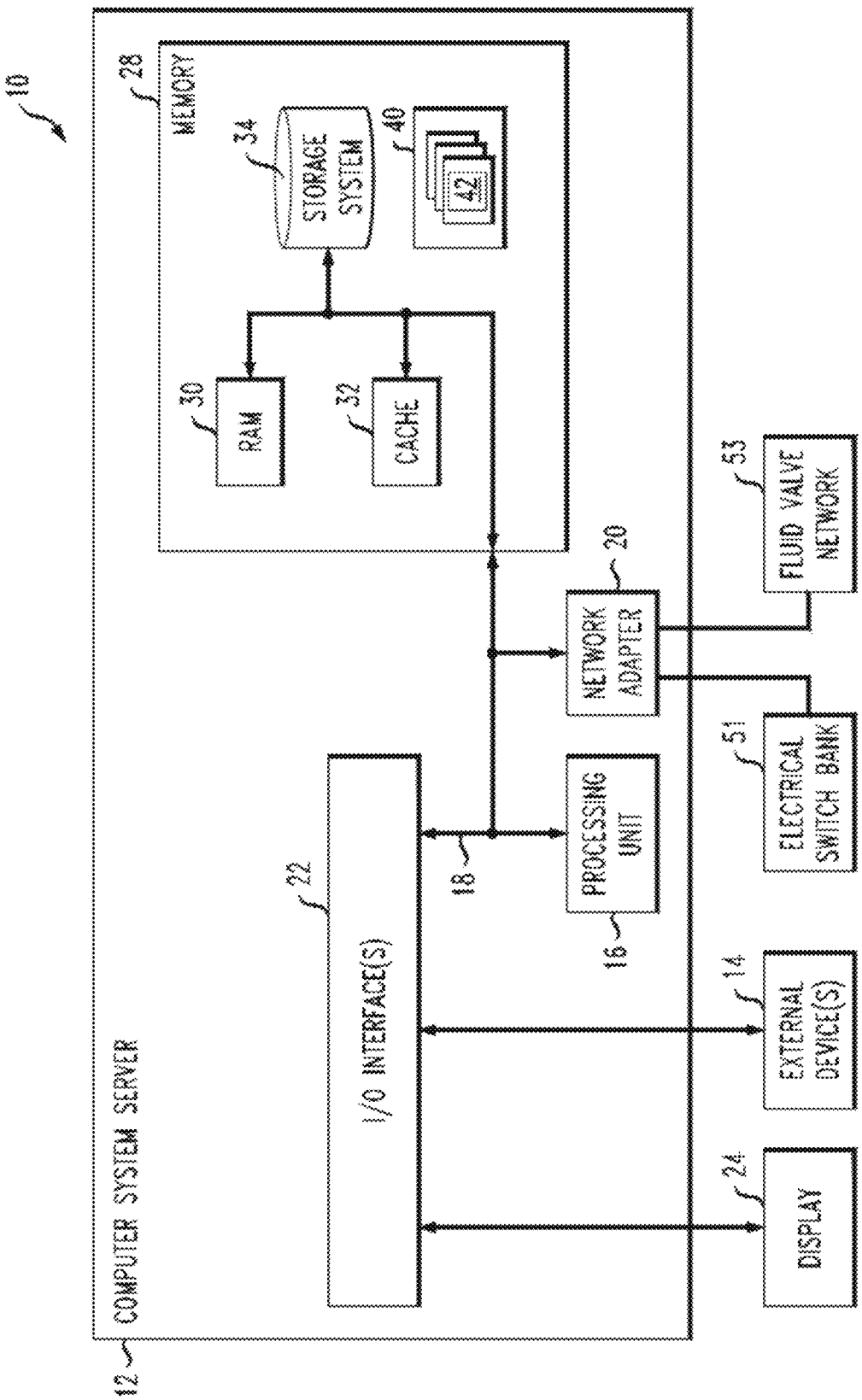
FIG. 7 depicts a computer system that may be useful in implementing one or more aspects and/or elements of the invention, also representative of a cloud computing node according to an embodiment of the present invention.

FIG. 7 depicts a computer system that may be useful in implementing one or more aspects and/or elements of the invention, also representative of a cloud computing node according to an embodiment of the present invention. Referring now to FIG. 7, cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/ server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/ non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 7, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 7) running a server program. It will be understood that such a physical server may or may not include a display and keyboard.

One or more embodiments can be at least partially implemented in the context of a cloud or virtual machine environment, although this is exemplary and non-limiting. Reference is made back to FIGS. 5-7 and accompanying text.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or s sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

Exemplary System and Article of Manufacture Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   obtaining a first data set, a second data set, and a machine learning model;
   constructing a subspace of the first data set that defines a metric for distance among elements of the first data set, wherein the metric ignores protected attributes in measuring a difference between samples to allow for free movement in a corresponding space;
   training the machine learning model on the first data set using a distributionally robust optimization approach based on the metric, wherein the distributionally robust optimization approach includes a regularization approach based on the metric and
   wherein the training of the machine learning model comprises defining an iteration of a loss matrix R, finding a solution to an optimization problem by executing a linear program on the iteration of the loss matrix, and assigning a distribution for inputs and outputs of the machine learning model, based on the solution to the optimization problem;
   producing an individually fair set of labels by applying the trained machine learning model to the second data set; and
   allocating a resource according to the individually fair set of labels.

2. The computer-implemented method of claim 1, wherein training of the machine learning model further comprises:
   defining a cost matrix C for the machine learning model;
   entering an iterative loop;
   in the loop:

fitting a base learner to pseudo-residuals of a loss function of the machine learning model, based on the distribution for inputs and outputs of the machine learning model; and updating a candidate classifier of the machine learning model, based on the loss function;

repeating the loop until a final iteration produces a finally updated candidate classifier; and returning the finally updated candidate classifier as the trained model.

3. The computer-implemented method of claim 2, wherein updating the candidate classifier comprises applying a gradient boosted descent algorithm to a decision tree of the model.

4. The computer-implemented method of claim 2, wherein the loss matrix R is defined as $$R_{i,j} = \ell(h,(x_i,y_j)),$$

$\ell$ being the loss, h being the score of input $x_i$, $y_j$ being the output of the machine learning model for input $x_j$.

5. The computer-implemented method of claim 2, wherein a cost function c of the cost matrix is defined as $$c((x_1,y_1),(x_2,y_2))=d_x^2(x_1,x_2)+\infty \cdot 1_{\{y_1 \neq y_2\}}.$$

x being inputs to the machine learning model, y being outputs from the machine learning model, $d_x^2$ being the square of a distance function on the metric.

6. The computer-implemented method of claim 2, wherein the robust loss function L(f) of the model is defined as $$L(f) = \sup_{Q: W_\mathcal{D}(Q,P_n) \leq \varepsilon} \mathbb{E}_Q[\ell(f, \mathcal{Z})],$$

$\mathbb{E}_Q$ being an expected value on the distribution Q of counterfactual inputs that are as close as possible to the actual inputs P while having different scores, $W^\mathcal{D}$ being an I-Wasserstein distance between distributions Q on $\mathcal{D}$ and P on $\mathcal{D}_0$, $\varepsilon$ being a budget for distance.

7. A computer-implemented method comprising:
obtaining a first data set, a second data set, and a machine learning model;
constructing a subspace of the first data set that defines a metric for distance among elements of the first data set, wherein the metric ignores protected attributes in measuring a difference between samples to allow for free movement in a corresponding space;
training the machine learning model on the first data set using a distributionally robust optimization approach based on the metric, wherein the distributionally robust optimization approach includes a regularization approach based on the metric, wherein the regularization approach comprises updating constraints λ using a first gradient descent technique, setting λ no less than zero and updating weights θ of the machine learning model using a second gradient descent technique;
producing an individually fair set of labels by applying the trained machine learning model to the second data set; and
allocating a resource according to the individually fair set of labels.

8. The computer-implemented method of claim 7, wherein the regularization approach comprises:
defining a fair regularizer for the machine learning model as the solution of an optimization problem;
entering a conditional loop that continues until convergence of a stochastic algorithm for solving the optimization problem;
in the loop:
sampling a mini-batch from the first data set x and from a corresponding first label set;
generating counterfactual data x' by maximizing a difference in score from each $x_t$ of x to each $x_t'$ of $x_\square'$, within the constraints λ such that distance between x and x' is minimized;
exiting the loop when the updated weights θ converge to produce the trained machine learning model; and
returning the fully trained machine learning model, wherein the updating the constraints λ and the updating the weights θ are performed within the loop.

9. The computer-implemented method of claim 8, wherein the fair regularizer R(h) is defined as $$R(h) \triangleq \begin{Bmatrix} \sup_{\Pi \in \Delta(X \times X)} & \mathbb{E}_\Pi[dy(h(x), h(x'))] \\ \text{subject to} & \mathbb{E}_\Pi[dx(x, x')] \leq \varepsilon \\ \square & \Pi(\cdot, X) = P_X \end{Bmatrix},$$

h(X) being the score of inputs x, Π being a solution to an optimization problem that produces a marginal distribution P of inputs x such that expected value $\mathbb{E}_\Pi$ of difference in outputs is maximized on data distribution Π, $\varepsilon$ being a budget for distance.

10. The computer-implemented method of claim 8, wherein the dual of the fair regularizer R(h) is defined as $$R(h)=\inf_{\lambda \geq 0}\{\lambda \varepsilon + \mathbb{E}_{P_x}[r_\lambda(h,x)]\},$$

$$r_\lambda(h,x) \triangleq \sup_{x' \in z, 22}\{dy(h(x),h(x'))-\lambda dx(x,x')\},$$

$\mathbb{E}_{P_x}$ being an expected value on distribution $P_x$, $d_y$ being distance between scores for inputs x, x'.

11. The computer-implemented method of claim 10, wherein the constraints λ are updated based on the gradient of the dual of the fair regularizer with respect to λ.

12. The computer-implemented method of claim 10, wherein the weights θ are updated based on the gradient of the loss function plus the gradient of the dual of the fair regularizer with respect to θ.

13. A computer-implemented method comprising:
obtaining a list of objects;
obtaining a machine learning model that is partly trained for ranking the list of objects in response to a given query;
constructing a subspace of the list of objects that defines a metric for distance among the objects, wherein the metric ignores protected attributes in measuring a difference between samples to allow for free movement in a corresponding space;
obtaining a set of queries on the list of objects;
defining a regularizer for the machine learning model as the solution of an optimization problem;
solving the optimization problem according to a stochastic algorithm;
producing an individually fair ranking of the list of objects, using the trained machine learning model in response to a received query; and
allocating resources according to the individually fair ranking, wherein the stochastic algorithm comprises entering a conditional loop that continues until convergence of the stochastic algorithm for solving the optimization problem;

in the loop:
    sampling a mini-batch from the set of queries q;
    generating a set of counterfactual queries $q_t'$ by minimizing distance on the metric between each $q_t$ of the set of queries and each $q_t'$ of the set of counterfactual queries, while maximizing difference between a score of each item in $q_t$ and a corresponding score of each item in $q_t'$;
    updating constraints $\lambda$ on the distance between $q_t$ and $q_t'$ according to a first gradient descent technique on the gradient of the dual of the regularizer; and
    updating weights $\theta$ of the machine learning model according to a second gradient descent technique on the sum of the loss function and the gradient of the dual of the regularizer; and
exiting the loop when the updated weights $\theta$ converge to produce a trained machine learning model for ranking a list.

14. The computer-implemented method of claim 13, wherein the dual of the regularizer R(h) is $$R(\pi) = \inf_{\lambda \geq 0} \{\lambda \epsilon + \mathbb{E}_{q \sim \mathcal{Q}}[r_\lambda(\pi, q)]\}, \text{ where}$$

$$r_\lambda(\pi, q) = \sup_{q' \in \mathcal{Q}} \{d_\mathcal{R}(\pi(\bullet|q), \pi(\bullet|q')) - \lambda d_\mathcal{Q}(q, q')\},$$

wherein $\mathbb{E}_q$ is an expected value on distribution q and $d_\mathcal{Q}$ is a metric on query distribution $\mathcal{Q}$.

* * * * *